United States Patent [19]

Repplinger et al.

[11] Patent Number: 5,568,548
[45] Date of Patent: Oct. 22, 1996

[54] HANG-UP CUP ASSEMBLY

[75] Inventors: Daniel J. Repplinger, Hawthorn Woods; Jennifer M. Hislop, Barrington, both of Ill.

[73] Assignee: Motorola, Inc., Schaumburg, Ill.

[21] Appl. No.: 492,265

[22] Filed: Jun. 19, 1995

[51] Int. Cl.[6] .............. H04M 1/00; A47F 7/14; A47B 91/00; F16M 11/04
[52] U.S. Cl. .............. 379/446; 379/454; 379/455; 379/426; 248/911; 248/346.06; 248/178.1
[58] Field of Search .............. 379/454, 455, 379/426, 447, 446, 449; 248/911, 346.06, 292.12, 178.1, 179.1

[56] References Cited

U.S. PATENT DOCUMENTS

| | | | |
|---|---|---|---|
| 2,868,367 | 1/1959 | Shiffman | 248/346.06 |
| 4,560,831 | 12/1985 | Bast et al. | 379/454 |
| 5,109,411 | 4/1992 | O'Connell | 379/454 |

OTHER PUBLICATIONS

The Antenna Company, Advertisement: "The New Posi-Lok™ Mounts and Custom Design Cradles", *Cellular Business*, Nov. 1992, vol. 11, No. 12, p. 25.

*Primary Examiner*—Krista M. Zele
*Assistant Examiner*—Jack Chiang
*Attorney, Agent, or Firm*—Randall S. Vaas

[57] ABSTRACT

A handset (100) is supported on mounting surface (104) by hang-up cup assembly (102). The hang-up cup assembly (102) includes a hang-up cup (106) and a pedestal (108). The hang-up cup is secured to pedestal by threaded fastener (210) and nut (212).

17 Claims, 7 Drawing Sheets

HANG-UP CUP ASSEMBLY

FIELD OF THE INVENTION

Present invention pertains to hang-up cups, and more particularly, to hang-up cups for telephone handsets.

BACKGROUND OF THE INVENTION

Telephone hang-up cups are well known which include a cup for receiving the earpiece of a cellular telephone handset. These hang-up cups provide secure storage for the handset in a vehicle. They are typically mounted in the vehicle at a location that facilitates the vehicle operator's access to the handset. When used with a handset having a display and a key set on the back surface thereof, the hang-up cup positions the back surface such that it is readily visible to the vehicle operator and accessible for purposes of dialing via the key set.

A difficulty encountered with these hang-up cups is providing a compact unit at a low cost that is readily adjustable to position the handset in a desired orientation in a preferred location. In order to provide versatility in positioning the hang-up cup, the hang-up cup is often mounted on a pedestal. The cup is movably mounted on the pedestal using an attachment mechanism. For movable supports, this attachment mechanism typically includes a ball and socket, or other complex mechanisms. These mechanisms permit flexible movement of the hang-up cup on the pedestal, but at great cost. Additionally, they are often difficult to install and to positionally readjust.

Accordingly, it is desirable to provide an improved hang-up cup and pedestal assembly which is compact in size, and versatile in use.

DETAILED DESCRIPTION OF THE DRAWINGS

A radiotelephone 103 (FIG. 1) includes a handset 100 mounted on mounting surface 104 using hang-up cup assembly 102. The mounting surface 104 may be a vehicle dashboard, a center counsel or any other surface at which the user would like to store the handset 100. The hang-up cup assembly 102 includes a hang-up cup 106 and a pedestal 108. The hang-up cup 106 is secured to pedestal 108 by fasteners, such as threaded fasteners bolt 210 (FIG. 2) and nut 212.

The radiotelephone 103 (FIG. 1) includes a transceiver 105 connected to handset 100. The handset 100 is a user interface for the radiotelephone 103, including a keyset 110, a display 112, a microphone (not shown) and a speaker (not shown) in earpiece 116. The transceiver 105 includes radio frequency (RF) circuitry (not shown) for transmitting and receiving signals via antenna 107 and handset 100. Power is supplied to the transceiver 105 via a conductor 109. The illustrated radiotelephone 103 is a cellular radiotelephone, with which the hang-up cup assembly 102 is particularly advantageous. However, the hang-up cup assembly 102 may be used with a handset of any other type of telephone, radios, or the like.

The hang-up cup 106 includes a body (FIG. 2) having a top surface 201, a left side surface 202, rear surface 203, a front surface 204, a right side surface 205, and a bottom surface 206. A recess 214 is formed in the top surface 201. The recess 214 is for receipt of earpiece 116 (FIG. 1) of handset 100. The hang-up cup 106 is manufactured of any suitable material, such as integrally molded of an organic polymer, and is preferably a substantially rigid material.

The recess 214 (FIG. 2) includes holes 218 and 219 in a recess bottom 207. Holes 218 and 219 are adapted to receive a bolt, or other suitable fastening device, 210. The recess 214 includes a front recess wall 208 and a rear recess wall 309 (FIG. 3). A front engagement member 322 is positioned on front recess wall 208. The front engagement member 322 is spring loaded. The illustrated engagement member is integrally formed with the hang-up cup 106, and includes a protrusion 325 on the ends of spring arms 326. The hang-up cup 106 is preferably molded of a rigid but flexible material, that permits the spring arms 326 to bend to facilitate deflection of the protrusion 325, and is sufficiently resilient to return protrusion 325 to the rest the position illustrated in FIGS. 2 and 3. The spring arms 326 and protrusion 325 are circumscribed by a hole through the housing body to permit deflection of the protrusion 325. A rear engagement member 324 is positioned on the rear recess wall 309. The rear engagement member 324 is an outwardly projecting member, which may be spring loaded or stationary as shown, and is received in a complimentary recess (not shown) in earpiece 116. The front engagement member 322 is received in another recess (not shown) in the earpiece 116.

Figure 4:
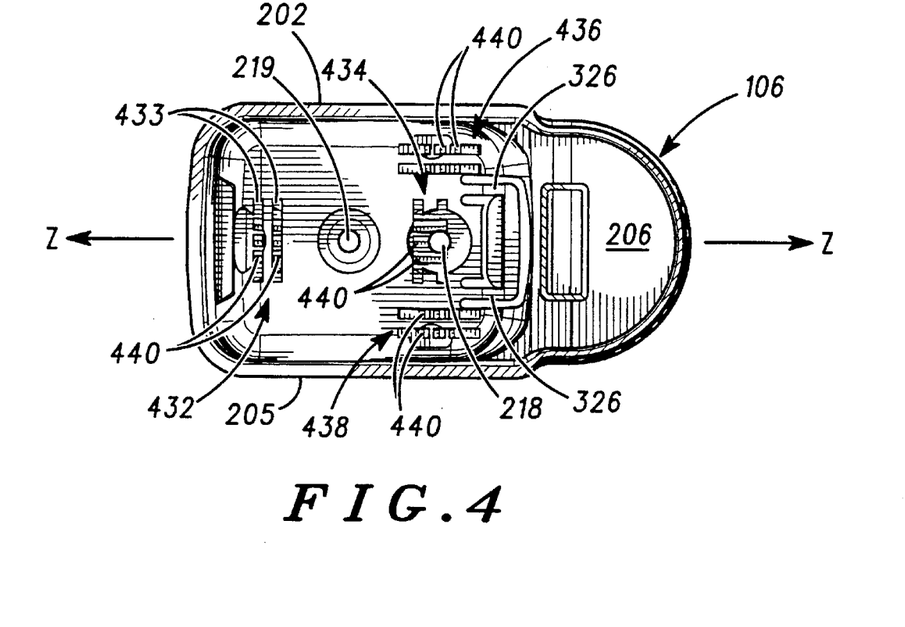
FIG. 4 is a bottom plan view illustrating the hang-up cup according to FIG. 3.

The bottom surface 206 (FIG. 4) of hang-up cup 106 includes rail 436 adjacent the left side surface 202 of hang-up cup 106 and rail 438 positioned along the right side surface 205 of hang-up cup 106. The rails 436 and 438 extend in parallel. Hole 218 is positioned between the rails 436 and 438. The bottom surface 206 also includes a rail 432 and a rail 434. Rails 432 and 434 extend in parallel on opposite sides of hole 219. Each of rails 432, 434, 436 and 438 includes two or more tracks, and in the illustrated embodiment, each generally includes two tracks (such as tracks 433 of rail 432) for stability. Teeth 440, only some of which are numbered, in each of the tracks of rails 432, 434, 436, and 438 form an engagement member on hang-up cup 106. Teeth in the two tracks of each rail are aligned to receive common teeth of the pedestal, described hereinbelow. Rails 432, 434, 436, and 438 are integrally molded on the hang-up cup 106.

The pedestal 108 (FIG. 2) includes rotator plates 244 and 246 projecting outwardly from a base 248. The rotator plates 244 and 246 include respective arcuate top surfaces 250 and 252. Each of the arcuate top surfaces 250, 252 includes a plurality of teeth 254 (only some of which are numbered) forming complementary mating members on the pedestal 108 for interlocking engagement with teeth 440 (FIG. 4) of rails 432, 434, 436 and 438. The teeth 254 (FIG. 2) are preferably wider than the rails 432, 434, 436, and 438, so that both tracks of each rail will sit on an arcuate top surface with the teeth interlocked. This provides a stable, firm hold between the hang-up cup 106 and the pedestal 108.

Rotator plate 244 includes an inner side 558 (FIG. 5) having a keyhole 562. Rotator plate 246 includes an inner side 559 having a keyhole 266. The keyholes 562 and 266 include a lower opening 566 and an upper opening 568 joined by a narrower channel 570. The channel 570 is formed by projections 571. The keyholes 562 and 266 receive nut 212 (FIG. 2), as described in greater detail herein below.

Figure 1:
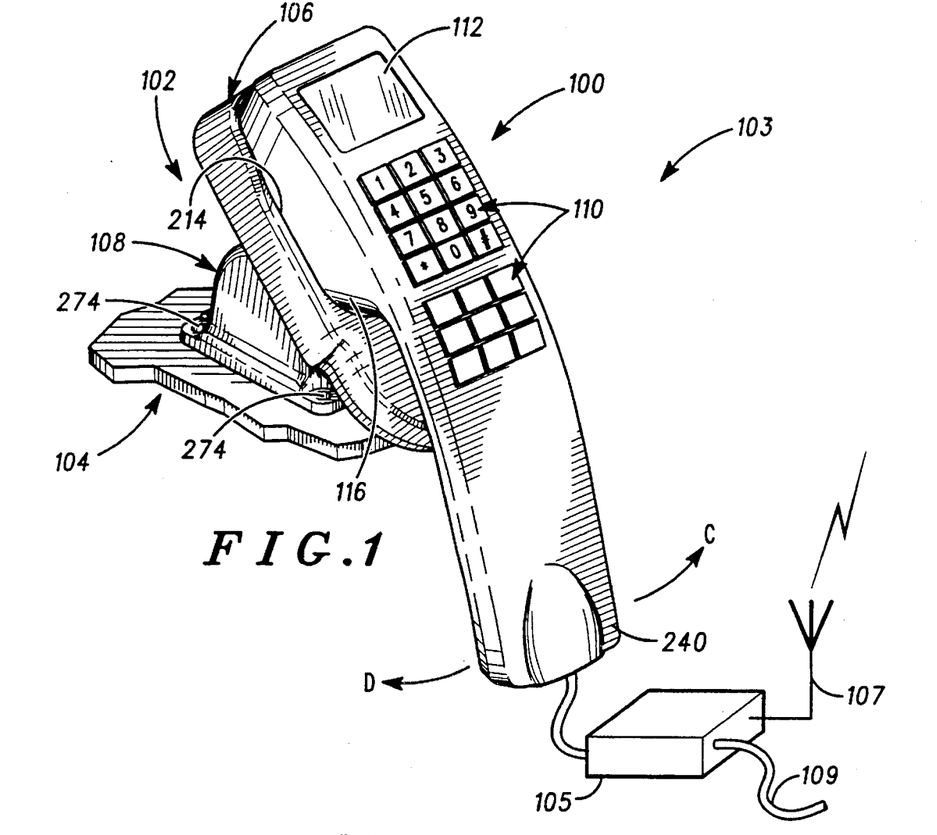
FIG. 1 is a front and left side perspective view illustrating a radio telephone and a hang-up cup assembly mounted to a mounting surface.

The base 248 (FIG. 5) is generally square as viewed from the bottom, including mounting holes 274 at each of the corners thereof. The mounting holes 274 are for receipt of respective threaded fasteners (not shown) used to secure the pedestal to mounting surface 104 (FIG. 1).

The pedestal 108 is of any suitable construction, such as molded from a polymer, stamped from a metal alloy, or the like. Preferably, the base is molded from a substantially rigid polymer.

The bolt 210 (FIG. 2) and nut 212 are used to secure the hang-up cup 106 on pedestal 108. Bolt 210 is preferably a conventional threaded machine bolt having a head 211. The nut 212 includes a central threaded hole 290 for receipt of bolt 2 10. The nut includes arms 292 and 294 projecting outwardly from opposite sides of the center. The distal ends of each of arms 292, 294 includes a respective hand 296, 298. The hands 296 and 298 are for centering the bolt in the upper opening 568 of keyholes 266 and 562, as described in greater detail herein below. The hands are larger than openings 568 to prevent the nut from sliding therethrough.

Figure 2:
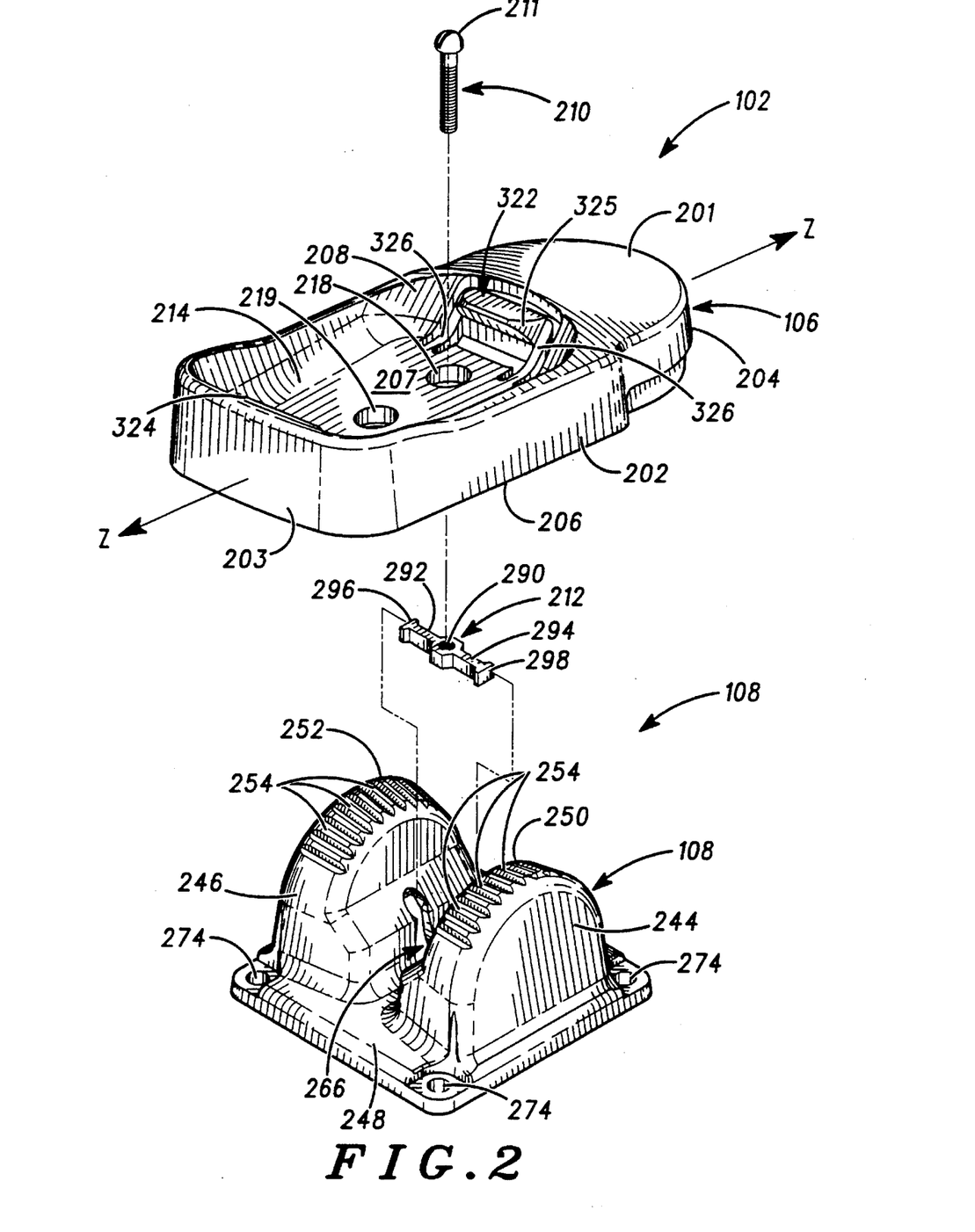
FIG. 2 is an exploded perspective view illustrating the hang-up cup assembly according to FIG. 1.
Figure 3:
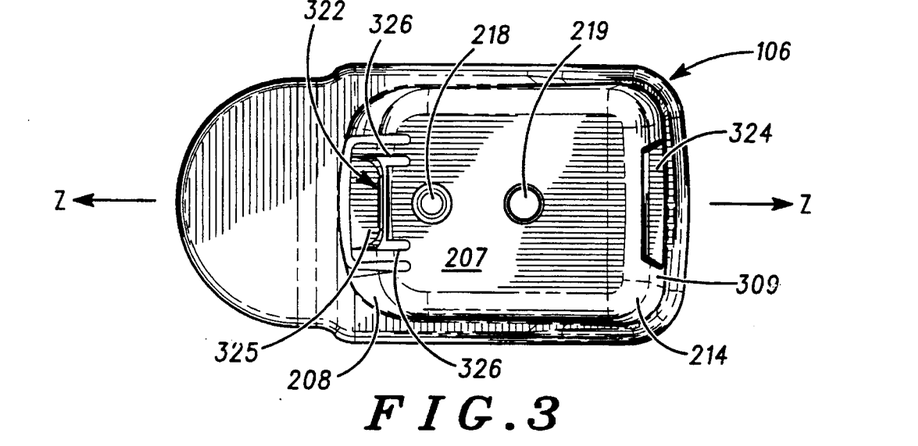
FIG. 3 is a top plan view illustrating the hang-up cup of FIG. 2.
Figure 5:
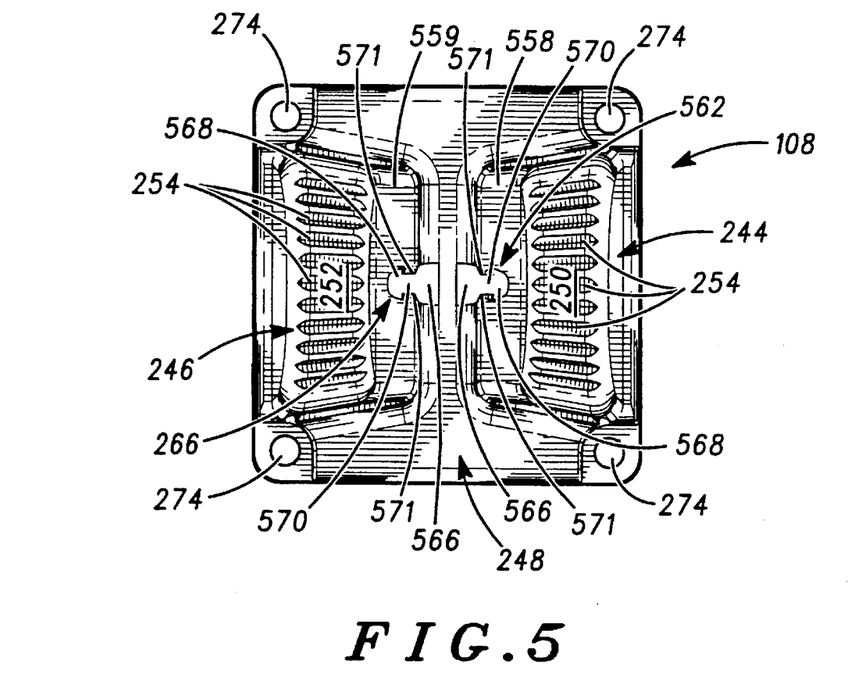
FIG. 5 is a top plan view illustrating the pedestal.
Figure 7:
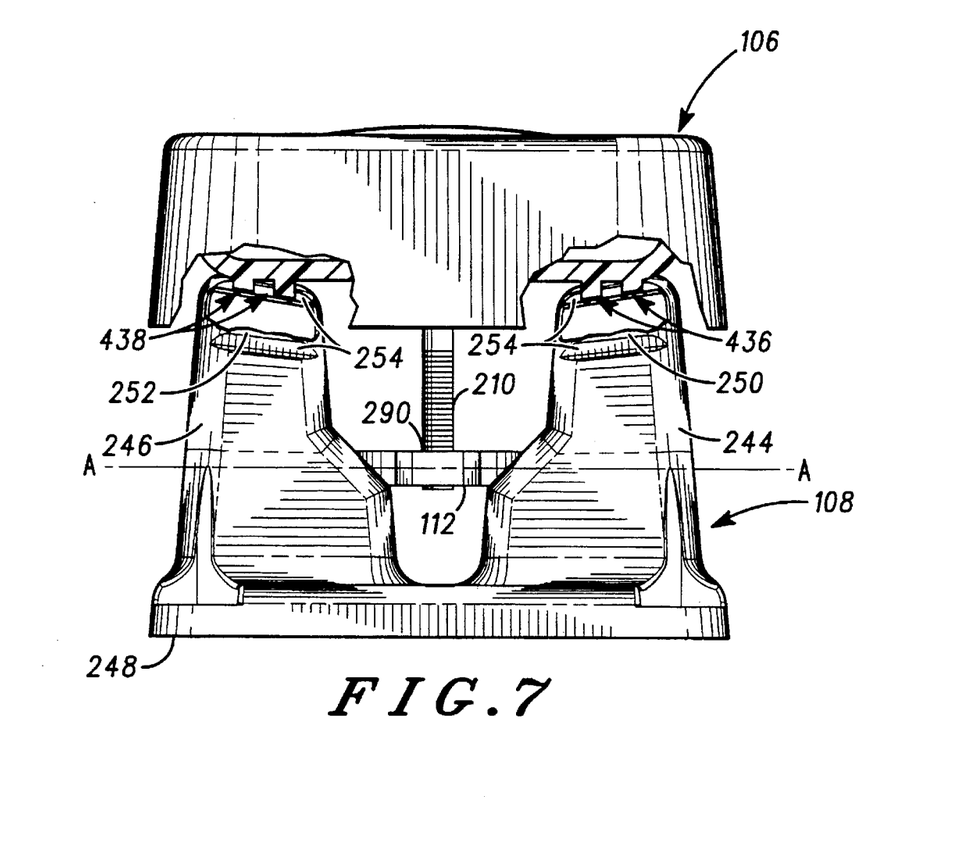
FIG. 7 is a rear elevational view illustrating the hang-up cup assembly according to FIG. 6.

With reference now to FIGS. 2 and 5, prior to assembly of the hang-up cup 106 to the pedestal 108, nut 212 is inserted through the lower openings 566 and into keyholes 266 and 562. The arms 292 and 294 of nut 212 are pushed upwardly through the narrow channel 570, which presses the projections 571 outwardly, until the bolt is received in upper opening 568. When the arms 292 and 294 are fully positioned in openings 568, the resilient projections 571 will return to their original position to hold the nut in opening 568 of keyholes 266 and 562. Arms 292 and 294 are loosely positioned in upper openings 568 to allow free rotation around pivot axis A (FIG. 7). Preferably, the longitudinal axis of the nut passes approximately through the focus for the arcuate surface. Hands 296 and 298 prevent the bolt from sliding through the openings 568.

The pedestal 108 (FIG. 1) is then mounted to mounting surface 104. Initially, the installer will consider positions for the pedestal in a vehicle according to different orientations of the hang-up cup 106 and the resulting position of handset 100 engaged therein. After selecting a position for the pedestal, the pedestal 108 is mounted to the mounting surface 104 using threaded fasteners (not shown) inserted through mounting holes 274.

Figure 6:
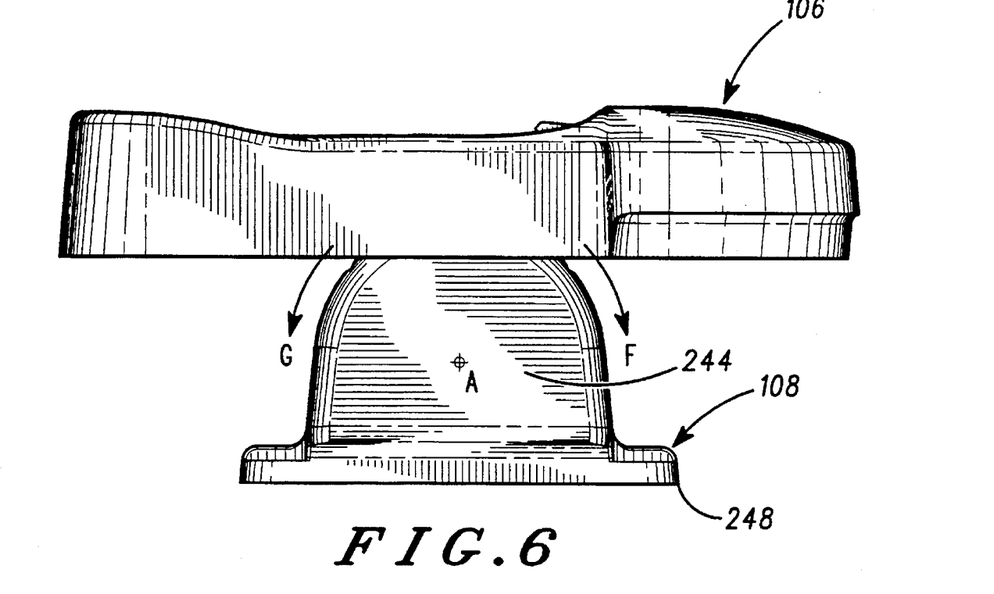
FIG. 6 is a side elevational view illustrating the hang-up cup assembly in an orthogonal axis orientation.
Figure 9:
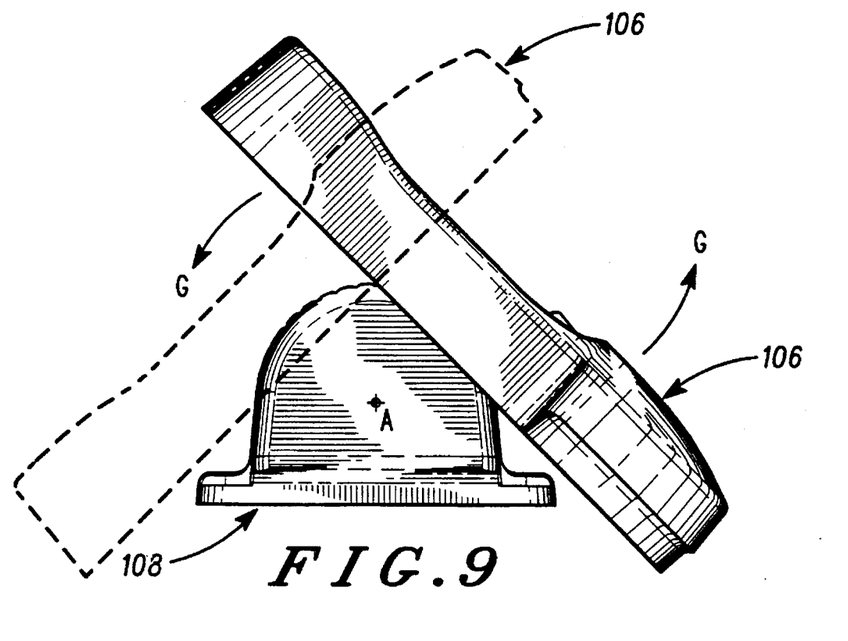
FIG. 9 is a side elevational view illustrating hang-up cup assembly rotational orientations different than that illustrated in FIG. 6.
Figure 10:
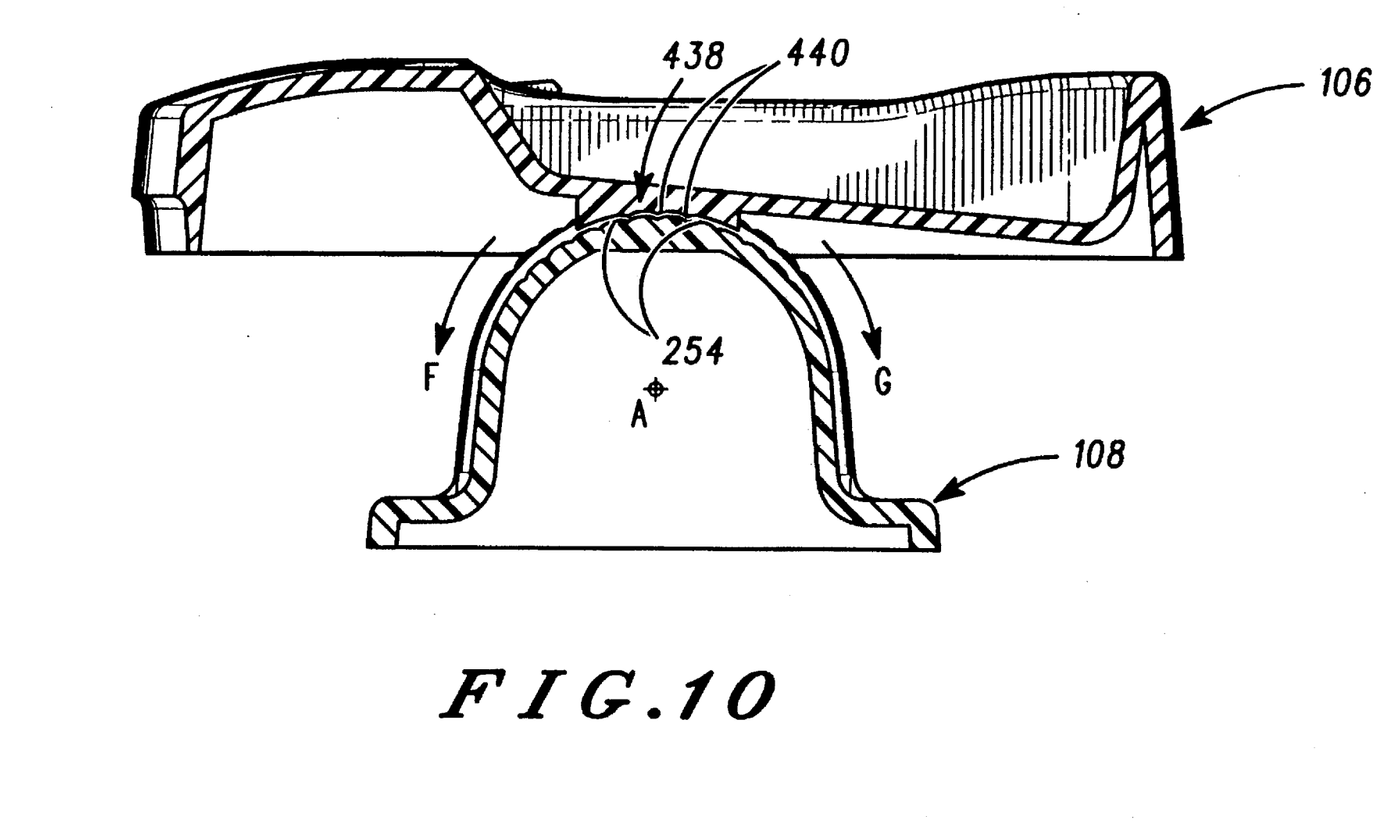
FIG. 10 is a cross-sectional view illustrating the hang-up cup assembly taken along plane 10—10 in FIG. 8.

The hang-up cup 106 is next positioned on the rotator plates 244 and 246. Either rails 436 and 438, or rails 432 and 434, of the hang-up cup 106, are juxtaposed with the arcuate top surfaces 250 and 252 of the pedestal 108 when positioned thereon. The longitudinal axis Z (FIG. 8) of the hang-up cup 106 is thus located at a desired orientation relative to the pivot axis A, through the longitudinal axis of nut 212. The longitudinal axis Z of the hang-up cup 106 is orthogonal to the pivot axis A, in the orthogonal axis orientation in FIG. 8. The rotational orientation may be such that the hang-up cup 106 is parallel to the base 248, as shown in FIG. 6 and FIG. 7, with rails 436 (FIG. 4) and 438 interlocked with arcuate top surfaces 250 (FIG. 5) and 252. Alternately, the rotational orientation is such that the hang-up cup is rotated forward (direction F) or backward (arrow G). An example of a forward rotation position is shown in solid in FIG. 9. An example of rotated back position is shown in phantom in FIG. 9. In any of the positions, teeth 440 will interlock with teeth 254 to hold the rotational orientation thereof, as best illustrated by FIG. 10. As can be seen in FIG. 10, the teeth 440 have tips which extend in and an arcuate plane complementary to the arc of the arcuate top surfaces 250 and 252 of the rotator plates 244 and 246 for snug interlocking with teeth 254.

Alternatively, the hang-up cup rails 432 (FIG. 4) and 434 are located in juxtaposition with arcuate top surfaces 250 (FIG. 5) and 252 of the pedestal 108. In this orientation, illustrated in FIG. 11, the longitudinal axis Z of hang-up cup 106 is parallel to the longitudinal axis A of nut 2 12. The hang-up cup 106 is thus oriented in a parallel axis orientation. The rotational orientation of hang-up cup 106 may be parallel to the base 248, as shown in solid in FIG. 11. Alternately, the rotational orientation of the hang-up cup 106 may be reoriented on the pedestal by rotating the hang-up cup 106 in direction of arrow H, such as the leftward rotated position shown in phantom in FIG. 12. The hang-up cup 106 can also be rotated rightward (the direction of arrow I as shown in phantom in FIG. 12) to the rightward rotated position illustrated in FIG. 12.

The hang-up cup 106 (FIG. 2) can thus be located with the longitudinal axis Z of the hang-up cup 106 extending in a plane between the rotator plates 244 and 246, or the hang-up cup 106 can be oriented with the longitudinal axis extending in a plane cutting through the rotator plates. In both of these alignments, the hang-up cup is reoriented at indexed positions along the perimeter of an arc defined by the arcuate top surfaces 250 and 252. The indexed positions are defined by the teeth 254 and 440. Accordingly, it can be seen that a wide variety of relative orientations of the hang-up cup 106 and the pedestal 108 are possible. This allows the user to position the hang-up cup 106 at an orientation which facilities access to a handset 100 after the pedestal 108 is mounted in a vehicle.

Figure 8:
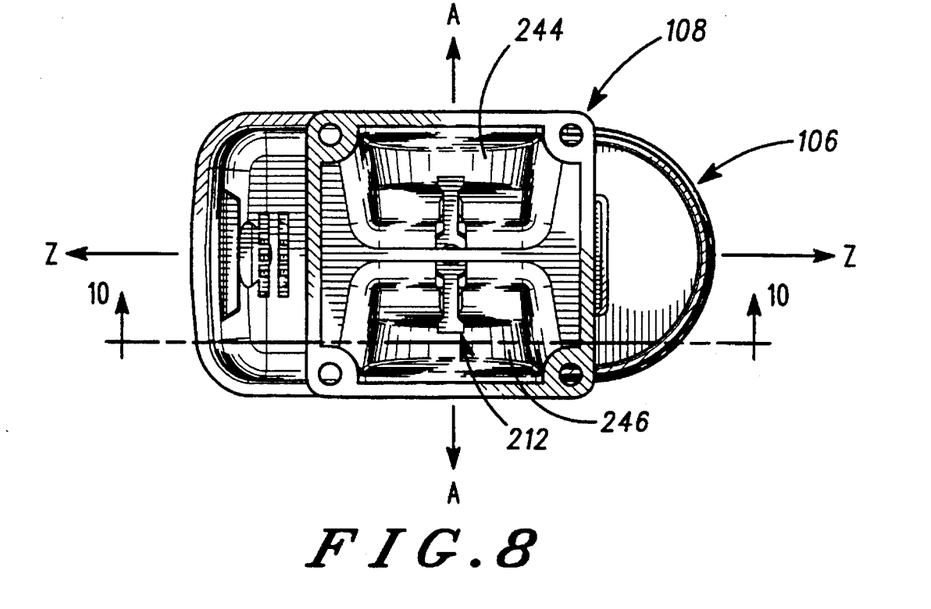
FIG. 8 is a bottom plan view illustrating the hang-up cup assembly according to FIG. 6.
Figure 11:
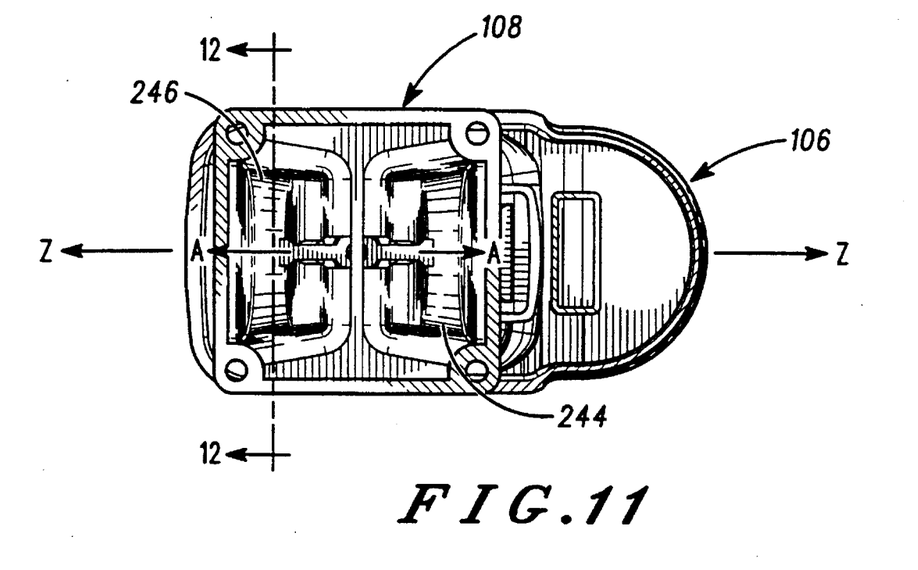
FIG. 11 is a bottom plan view illustrating the hang-up cup assembly with parallel axis orientation.
Figure 12:
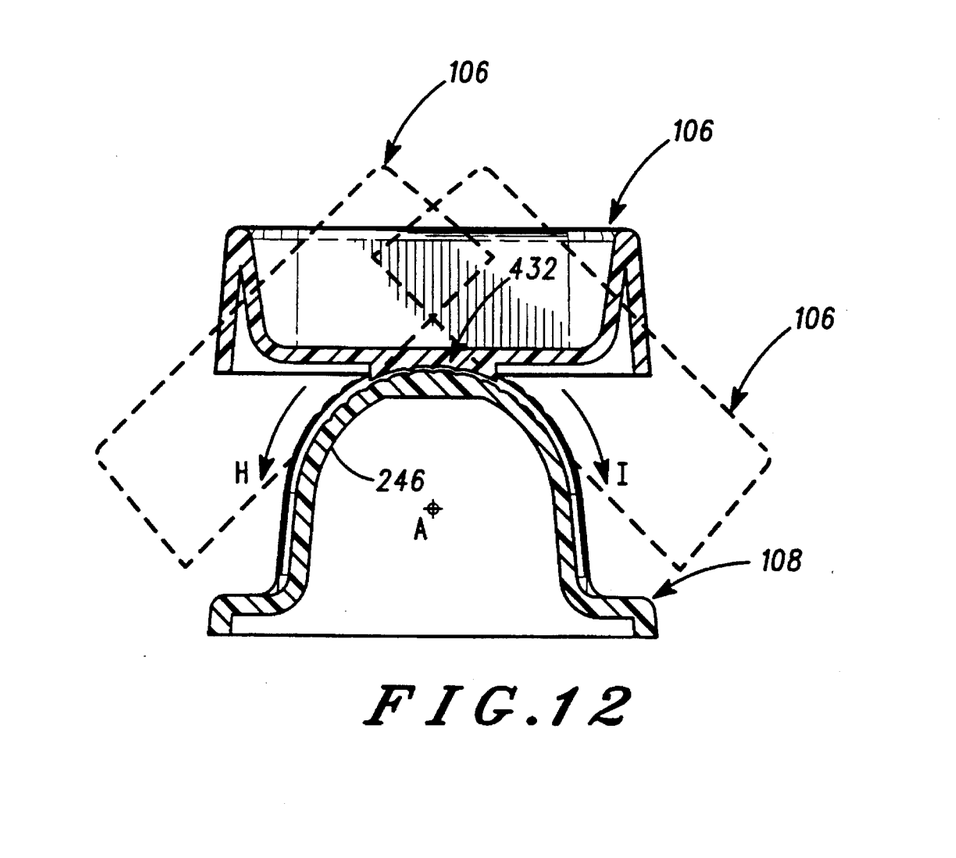
FIG. 12 is a cross-sectional view illustrating the hang-up cup assembly taken along plane 12—12 in FIG. 11.

Once the hang-up cup 106 is oriented on pedestal 108, the bolt 210 is next inserted through holes 218 or 219. If oriented as shown in FIG. 8, the bolt is inserted through hole 218. If the oriented as shown in FIG. 11, the bolt is inserted through hole 219. Nut 212 is positioned such that the threaded end of bolt 2 10 is positioned to be screwed into opening 290. By screwing the bolt 210 into nut 212, the hang-up cup 106 is tightened against rotator plates 244 and 246. The hang-up cup 106 is thus firmly, and securely, held in a desired orientation on pedestal 108.

In the preferred embodiment, surfaces 250 (FIG. 7) and 252 of the rotator plates 244 and 246 are angled downwardly and inwardly toward the central threaded hole 290 of the nut 2 12 oriented on axis A. Rails 436 and 438, for one orientation of the hang-up cup, and rails 432 and 434 for the other orientation of the hang-up cup, having at least two contact points along a line with substantially the same slope as the upper surfaces. In the illustrated embodiment, the ends of rails 436 and 438, and rails 432 and 434, are angled downwardly and inwardly towards hole 290 at the same angle as surfaces 250 and 252, when the hang-up cup 106 is properly positioned on the pedestal 108. Because of the angles of the intermating surfaces of the hang-up cup 106 and the pedestal 108, a locking and centering force is created when bolt 210 is tightened into nut 212. This force automatically pushes the hang-up cup 106 to the center of the pedestal 108, if it is not properly positioned initially by the installer or user, as bolt 210 is tightened.

After being secured, the bolt 210 may be loosened to permit rotation of the hang-up cup 106 on the pedestal 108. Rotation is around axis A, which is the longitudinal axis of the nut 212 (best shown in FIG. 7). When the hang-up cup 106 is repositioned at a desired location, the bolt 210 is again tightened, thereby preventing further rotation of the hang-up cup 106 and securing the hang-up cup 106 in a fixed position. The user is thus able to readily reposition the hang-up cup 106 at a variety of orientations. When teeth 440 and 254 are interlocked, the hang-up cup 106 is securely fastened to the pedestal, and the bolt tightened, the hang-up cup is firmly mounted to the mounting surface 104.

The user then inserts the earpiece of 116 (FIG. 1) into the recess 214 5 of the hang-up cup 106. To do this, the rear engagement member 324 (FIG. 3) is inserted into a recess in the earpiece (not shown) and the handset 100 is pushed in direction D (FIG. 1) toward the recess. Upon rotation, the protrusion 325 will move inwardly on arms 326 until it snaps into a recess (not shown) in the handset 100. The user can remove the handset 100 by pulling it in direction C. The earpiece 116 will slide past protrusion 325, which deflects into the interior of the hang-up cup 106, to allow the earpiece 116 to pass thereby. The hang-up cup assembly 102 is sufficiently stiff to accommodate the force exerted by users in inserting and removing the handset 100, and sufficiently versatile in mounting to permit access thereto.

Thus it can be seen that a hang-up cup assembly is disclosed having a compact size and providing flexibility in the positioning thereof. The hang-up cup includes engagement members on an underside thereof oriented in different directions. The arcuate pedestal includes complementary mating members on a top surface thereof for indexed locking with the engagement members at different rotational positions of the hang-up cup relative to the pedestal. This allows the hang-up cup to be repositioned on the pedestal through multiple axis orientations. A fastener for securing the hang-up cup on the pedestal rotates in the pedestal to provide a rotation axis for the hang-up cup. A handset is removably carried on the hang-up cup such that the orientation of the handset is adjusted by rotating the hang-up-cup on the pedestal. The hang-up cup assembly provides a secure connection of the hang-up cup and pedestal, such that the mounting base for the handset is rigid, and withstands the forces exerted thereon by insertion and removal of the handset.

We claim:

1. A hang-up cup assembly comprising:

a hang-up cup having a surface including a first engagement member extending in a first direction and a second engagement member extending in second direction, the first and second directions being different;

a pedestal having a complementary engagement member to engage the first and second engagement members, the first engagement member to mate with the complementary engagement member in the first direction such that the hang-up cup engages the complementary engagement member when rotated to different orientations relative to the pedestal in a first plane, and the complementary engagement member to mate with the second engagement member in the second direction such that the hang-up cup engages the complementary engagement member when rotated to different orientations relative to the pedestal in a second plane, whereby the first engagement member is positioned on the complementary engagement member to permit rotation in the first plane and the second engagement member is positioned on the complementary engagement member to permit rotation in the second plane; and a fastener for securing a position of the hang-up cup on the pedestal.

2. The hang-up cup assembly as defined in claim 1, wherein the fastener includes a member carried on the pedestal which provides a pivot axis for the hang-up cup on the pedestal.

3. The hang-up cup assembly as defined in claim 2, wherein the first and second engagement members extend in orthogonal directions such that the first and second planes are orthogonal.

4. The hang-up cup assembly as defined in claim 3, wherein each of the first and the second engagement members includes teeth to engage teeth on a top surface of the complementary engagement member.

5. The hang-up cup assembly as defined in claim 4, wherein the complementary engagement member includes two arcuate surfaces.

6. A hang-up cup assembly, comprising:

a hang-up cup including a cup body having a recess in a top surface for receipt of telephone handset, the cup body including a bottom surface having a first engagement member extending in a first direction and a second engagement member extending in second direction;

a pedestal including a pedestal body for positioning on a support surface, the pedestal body including a complimentary mating member for coupling to the first engagement member when the hang-up cup is oriented in a first axis orientation and coupling to the second engagement member when the hang-up cup is oriented in a second axis orientation, wherein the first engagement member, the second engagement member, and the complementary mating member are shaped to permit attachment of the hang-up cup in different rotational orientations in both the first axis orientation and the second axis orientation; and a fastener carried on the hang-up cup and the pedestal for releaseably holding the pedestal and the hang-up cup together.

7. The hang-up cup assembly as defined in claim 6 wherein the complementary mating member includes at least one arcuate surface.

8. The hang-up cup assembly as defined in claim 7, wherein the at least one arcuate surface includes teeth.

9. The hang-up cup assembly as defined in claim 8, wherein the first and second engagement members include teeth.

10. The hang-up cup assembly as defined in claim 9, wherein the teeth of the first and second engagement members have tips which terminate in an arcuate plane having an arc complementary to the at least one arcuate surface.

11. The hang-up cup assembly as defined in claim 9, wherein the fastener includes a nut carried in the pedestal such that it rotates, a longitudinal axis of the nut passing approximately through a focus of the at least one arcuate surface.

12. The hang-up cup assembly as defined in claim 6, wherein the complementary mating member includes two rotator plates, each of the rotator plates having an upper surface that mates with the first engagement member.

13. The hang-up cup assembly as defined in claim 12, wherein the upper surfaces of the rotator plates slope downwardly toward one another.

14. The hang-up cup assembly as defined in claim 13, wherein the first engagement member includes at least one engagement member for mating with the upper surfaces and having at least two contact points along a line with substantially the same slope as the upper surfaces.

15. A radiotelephone assembly comprising:
- a hang-up cup including engagement members on an underside thereof and having a longitudinal axis, the hang-up cup including two engagement members oriented in different directions;
- a pedestal for attachment to a mounting surface, the pedestal including arcuate complementary mating members on a top thereof, the mating members indexed for locking engagement with the engagement members at different rotational positions of the hang-up cup relative to the pedestal, whereby the hang-up cup may be rotated through two orientations of the hang-up cup longitudinal axis relative to the pedestal by locking different engagement members into the mating members;
- a fastener carried on the hang-up cup and the pedestal, the fastener rotating in the pedestal to provide a rotation axis and being used for securing engagement of the hang-up cup on the pedestal;
- a handset removably stored in the hang-up cup, a storage position for the handset relative to the mounting surface adjusted by rotating the hang-up cup on the pedestal;
- a transceiver electrically coupled to said handset for transmitting and receiving signals; and
- an antenna coupled to the transceiver.

16. The radiotelephone as defined in claim 15, wherein the engagement members include two sets of tracks.

17. The radiotelephone as defined in claim 16, wherein the mating members include arcuate plates.

\* \* \* \* \*